United States Patent
Patel et al.

(10) Patent No.: US 9,815,361 B2
(45) Date of Patent: Nov. 14, 2017

(54) SPLIT BUSHING TORQUE STRUT ISOLATOR ASSEMBLY

(71) Applicants: Krishant Patel, Lake Orion, MI (US); Brian D Dwyer, Ortonville, MI (US); John C St. Pierre, Jr., Macomb, MI (US); Daniel L Brown, Ortonville, MI (US); Jacob W Brown, Orion Township, MI (US)

(72) Inventors: Krishant Patel, Lake Orion, MI (US); Brian D Dwyer, Ortonville, MI (US); John C St. Pierre, Jr., Macomb, MI (US); Daniel L Brown, Ortonville, MI (US); Jacob W Brown, Orion Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/812,105

(22) Filed: Jul. 29, 2015

(65) Prior Publication Data
US 2017/0028834 A1    Feb. 2, 2017

(51) Int. Cl.
*B60K 5/12*    (2006.01)
*F16F 3/12*    (2006.01)
*F16F 1/38*    (2006.01)

(52) U.S. Cl.
CPC .......... *B60K 5/1241* (2013.01); *B60K 5/1208* (2013.01); *F16F 1/3821* (2013.01); *F16F 1/3842* (2013.01); *F16F 1/3849* (2013.01); *F16F 1/3863* (2013.01); *F16F 3/12* (2013.01)

(58) Field of Classification Search
CPC ... B60K 5/1241; B60K 5/1208; F16F 1/3821; F16F 1/3842; F16F 1/3849; F16F 1/3863
See application file for complete search history.

(56) References Cited

U.S. PATENT DOCUMENTS

| 4,240,517 A | 12/1980 | Harlow, Jr. et al. |
| 4,685,531 A | 8/1987 | Kopich |
| 4,706,946 A * | 11/1987 | Thorn .................. B60K 5/1241 248/636 |

(Continued)

FOREIGN PATENT DOCUMENTS

| DE | 10117587 A1 * | 10/2002 | ........... B60K 5/1241 |
| DE | 102009028458 A1 | 2/2011 | |

(Continued)

OTHER PUBLICATIONS

International Search Report and Written Opinion dated Nov. 9, 2016 for International Application No. PCT/US2016/043812, International Filing Date Jul. 25, 2016.

*Primary Examiner* — Eret McNichols
(74) *Attorney, Agent, or Firm* — Ralph E Smith (57) ABSTRACT

A split bushing torque strut isolator assembly for a vehicle is provided. The assembly includes a lower bushing configured to be disposed in a vehicle structural component, a bushing housing configured to be coupled to the vehicle structural component, an upper bushing disposed at least partially within the bushing housing, the upper bushing being separate from the lower bushing, and a torque rod having a first end and a second end, the second end being disposed between the upper and lower bushings. A method of assembling the split bushing torque strut isolator assembly is also provided.

14 Claims, 6 Drawing Sheets

(56) References Cited

U.S. PATENT DOCUMENTS

| | | | | | |
|---|---|---|---|---|---|
| 5,129,479 | A | * | 7/1992 | Fujii | B60K 5/1216 |
| | | | | | 180/297 |
| 5,374,038 | A | | 12/1994 | Hein | |
| 5,832,044 | A | | 11/1998 | Sousa et al. | |
| 8,876,092 | B2 | * | 11/2014 | Wojcieson | H02K 5/24 |
| | | | | | 248/604 |
| 8,967,599 | B2 | * | 3/2015 | Yoneyama | B29C 45/14344 |
| | | | | | 267/141.1 |
| 9,027,527 | B2 | * | 5/2015 | Higashi | F16F 15/08 |
| | | | | | 123/198 R |
| 9,212,716 | B2 | * | 12/2015 | Yoon | F16F 6/005 |
| 9,242,542 | B2 | * | 1/2016 | Loeffelsender | B60K 5/1241 |
| 9,273,753 | B2 | * | 3/2016 | Yun | F16F 1/3849 |
| 9,347,517 | B2 | * | 5/2016 | Yokawa | F16F 1/3849 |
| 9,610,979 | B2 | * | 4/2017 | Hirano | B62D 21/11 |
| 2016/0176279 | A1 | * | 6/2016 | Inatomi | F16F 1/3849 |
| | | | | | 248/638 |
| 2016/0193907 | A1 | * | 7/2016 | Satou | F16F 1/3849 |
| | | | | | 267/140.4 |
| 2016/0221430 | A1 | * | 8/2016 | Kim | B60K 5/1241 |

FOREIGN PATENT DOCUMENTS

| | | | | |
|---|---|---|---|---|
| DE | 102012017319 A1 | | 10/2013 | |
| DE | 102013213078 A1 | | 1/2015 | |
| DE | 102014211336 A1 | * | 1/2015 | ........... B60K 5/1241 |
| DE | WO 2015155319 A1 | * | 10/2015 | ........... B60K 5/1241 |
| FR | EP 1837533 A2 | * | 9/2007 | ............... F16C 7/04 |
| KR | DE 102014113235 A1 | * | 7/2015 | ........... F16F 1/3849 |

* cited by examiner

SPLIT BUSHING TORQUE STRUT ISOLATOR ASSEMBLY

FIELD

The present application relates generally to a torque strut isolator assembly for a vehicle and, more particularly, to a split bushing torque strut isolator assembly.

BACKGROUND

It is well known to utilize a torque strut between an engine and vehicle chassis to control pitching of a power train. Typically, elastomeric bushings are used at pivot connections of the torque strut to provide a soft substantially linear spring rate at small vibratory pitching amplitudes occurring with low torque. In addition, the bushings may be configured so that for large pitching powertrain amplitudes occurring at high torque, the strut mounts additionally provide non-linear rates that increase with increasing large pitching amplitudes so as to isolate such pitching vibrations of the power train. However, conventional torque struts are typically not usable in all-wheel drive applications or may provide limited options for assembling the engine to the cradle or vehicle body. Thus, while conventional torque struts work for their intended purpose, there remains a need for improvement in the relevant art.

SUMMARY

In one aspect, a split bushing torque strut isolator assembly for a vehicle is provided. The assembly includes a lower bushing configured to be disposed in a vehicle structural component, a bushing housing configured to be coupled to the vehicle structural component, an upper bushing disposed at least partially within the bushing housing, the upper bushing being separate from the lower bushing, and a torque rod having a first end and a second end, the second end being disposed between the upper and lower bushings.

In addition to the foregoing, the described assembly may include one or more of the following features: wherein the upper and lower bushings are elastomeric bushings; wherein the lower bushing comprises an inner diameter configured to receive a fastener; wherein the torque rod comprises an aperture configured to receive the fastener; wherein the upper bushing comprises an inner diameter configured to receive the fastener; wherein the lower bushing comprises a first notched portion, and the upper bushing comprises a second notched portion; wherein the torque rod second end is disposed between the first and second notched portions and is at least partially supported by the upper and lower bushings; wherein the vehicle structural component is a vehicle cradle and the torque rod first end is configured to be coupled to a vehicle engine; and wherein the bushing housing is positioned over the lower bushing such that the upper bushing is positioned over the lower bushing and the upper bushing is not positioned in the cradle.

In another aspect, a method of assembling a split bushing torque strut isolator assembly is provided. The method includes providing a cradle, inserting a lower bushing into the cradle, and lowering a torque rod onto the lower bushing. The method further includes providing a bushing housing having an upper bushing disposed at least partially in the bushing housing, orienting the bushing housing over the torque rod such that the torque rod is disposed between the upper and lower bushings, and coupling the bushing housing to the cradle.

In addition to the foregoing, the method may include one or more of the following features: wherein lowering a torque rod comprises vertically lowering a torque rod onto the lower bushing; disposing the upper bushing in the bushing housing; inserting a fastener through the lower bushing, the torque rod, and the upper bushing; coupling the torque rod to a vehicle engine; coupling the torque rod to a bracket coupled to a vehicle engine; and wherein the torque rod is lowered onto the lower bushing without horizontal movement of the torque rod.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
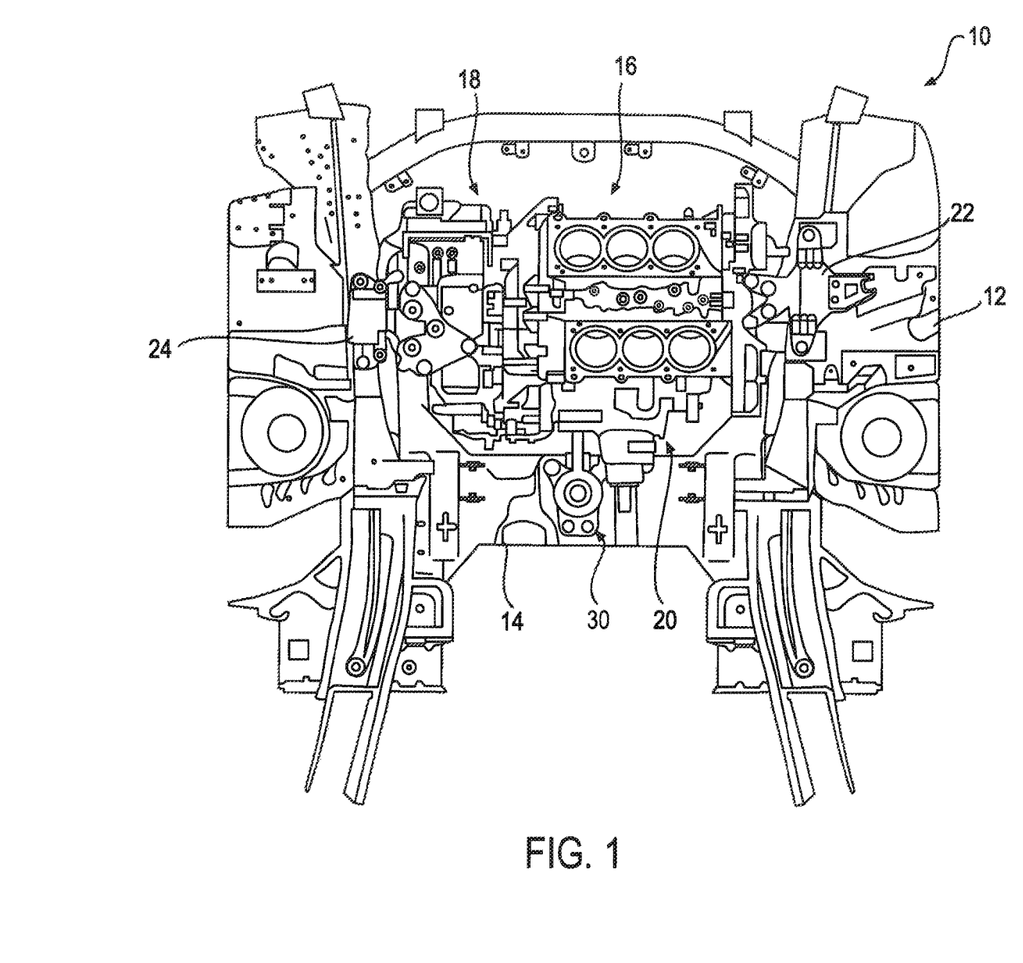
FIG. 1 is a plan view of a vehicle having an exemplary torque strut isolator assembly in accordance with the principles of the present disclosure.
Figure 2:
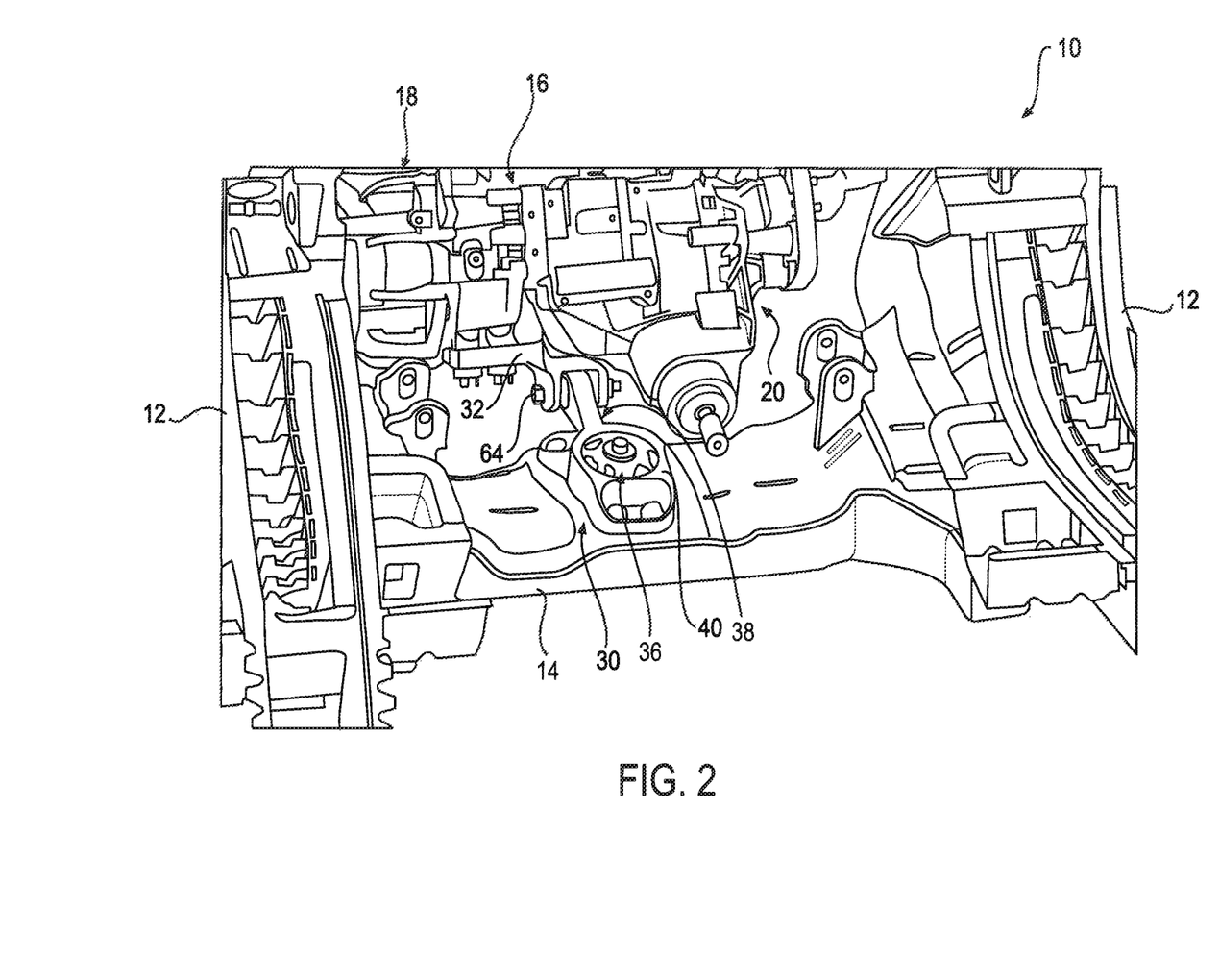
FIG. 2 is a perspective view of the vehicle shown in FIG. 1 and illustrating an exemplary torque strut isolator assembly in accordance with the principles of the present disclosure.

With initial reference to FIGS. 1 and 2, a front portion of a vehicle 10 is illustrated. The front portion of vehicle 10 generally includes a vehicle body and/or frame 12, a vehicle structural component or cradle 14, an engine 16, a transmission 18, and a power takeoff unit (PTU) 20. Engine 16 and transmission 18 are respectively mounted to frame 12 with an engine mount 22 and a transmission mount 24 (FIG. 1). PTU 20 is operably coupled to engine 16 and transmission 18 and is configured to provide vehicle 10 with all-wheel drive or four-wheel drive capability.

Figure 3:
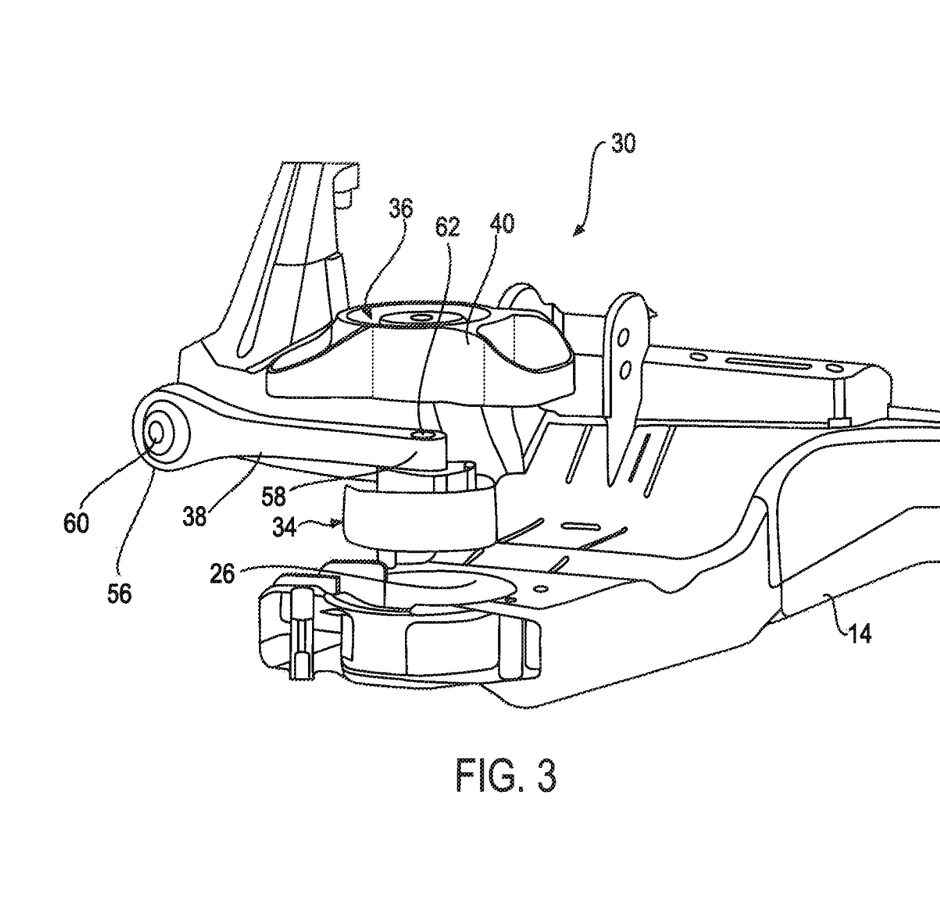
FIG. 3 is a partially exploded view of the torque strut isolator assembly that may be utilized with the vehicle as shown in FIGS. 1 and 2 in accordance with the principles of the present disclosure.
Figure 4:
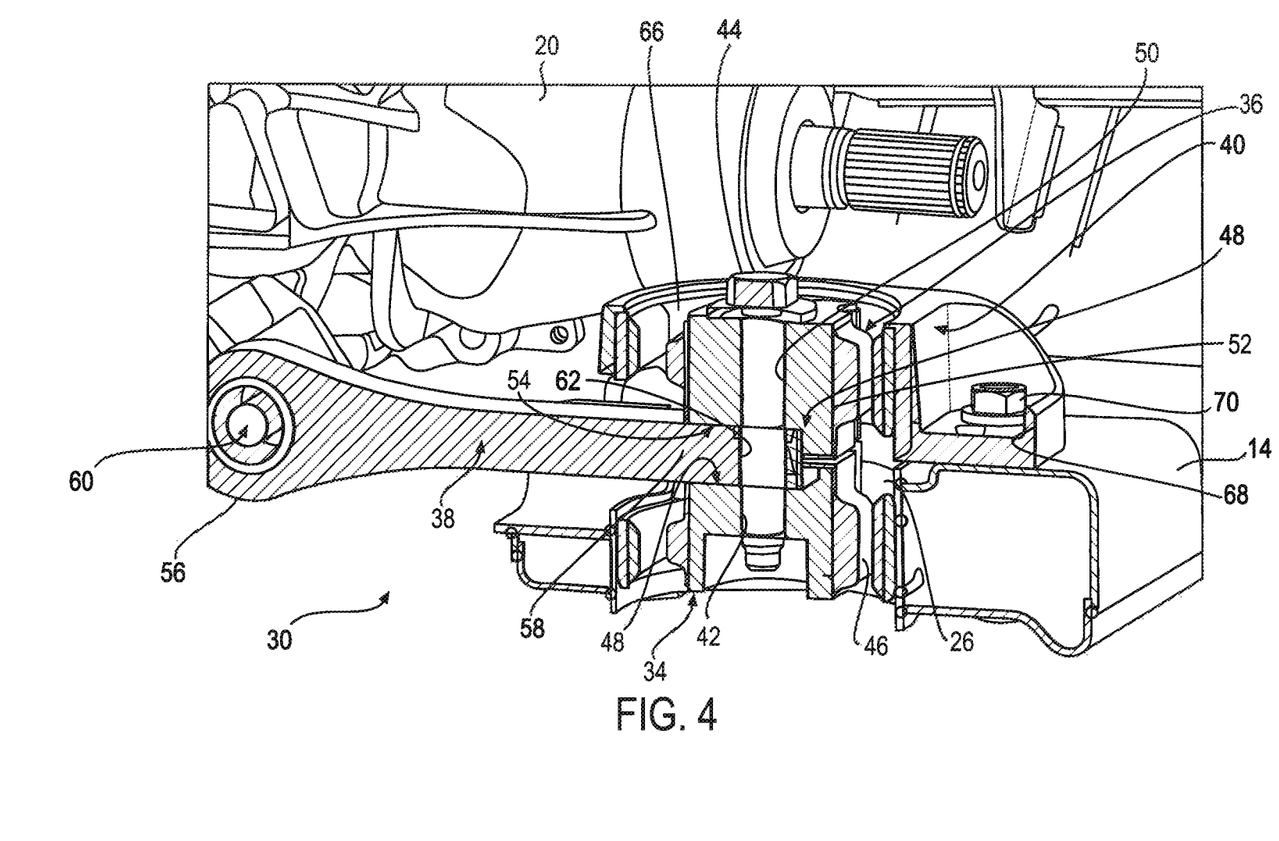
FIG. 4 is a sectional view of the torque strut isolator assembly in accordance with the principles of the present disclosure.
Figure 5:
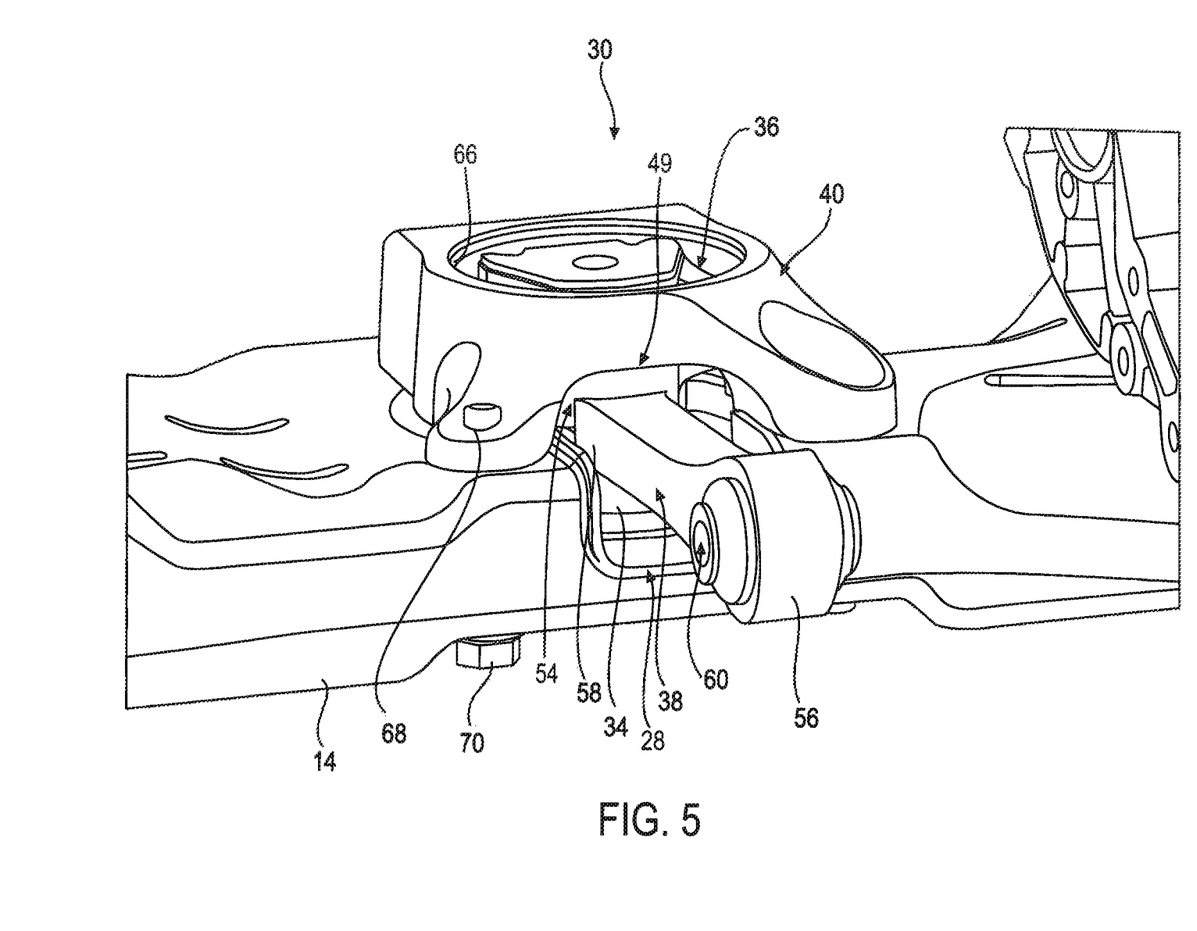
FIG. 5 is a perspective view of the torque strut isolator assembly shown in FIGS. 1-4 mounted to a cradle in accordance with the principles of the present disclosure.

With additional reference to FIGS. 3-5, vehicle 10 includes an exemplary split bushing torque strut isolator assembly 30 configured to be coupled between cradle 14 and engine 16. Torque strut isolator assembly 30 is configured to dampen forces (i.e., vibration and torque input) imparted by engine 16 onto vehicle frame 12. As shown in FIG. 2, torque strut isolator assembly 30 is coupled to engine 16 with a bracket 32. Although torque strut isolator assembly 30 is illustrated coupled between cradle 14 and engine 16, the assembly 30 may be utilized in various other locations of vehicle 10 or in various other vehicles.

In the illustrated exemplary embodiment, torque strut isolator assembly 30 generally includes a first or lower bushing 34, a second or upper bushing 36, a torque rod 38, and an upper bushing housing 40. In one embodiment, bushing 34 and/or 36 are fabricated from an elastomeric material and housing 40 is fabricated from a metal such as aluminum. However, bushings 34, 36 and housing 40 may be fabricated from a structurally rigid material (e.g., aluminum).

Lower bushing 34 includes an inner diameter 42 configured to receive a bolt or fastener 44 (FIG. 4), an outer diameter 46, and a notched portion 48 configured to provide clearance for at least a portion of torque rod 38. Lower bushing 34 is disposed (e.g., pressed) in a lower bushing receiving aperture 26 (see FIGS. 3 and 4) formed in cradle 14.

Upper bushing 36 includes an inner diameter 50 configured to receive fastener 44, an outer diameter 52, and a notched portion 54 configured to provide clearance for at least a portion of torque rod 38. Upper bushing 36 is disposed (e.g., pressed) into upper bushing housing 40.

Torque rod 38 includes a first end 56 and a second end 58 (see FIGS. 3 and 4). Torque rod first end 56 includes an aperture 60 configured to receive a bolt or fastener 64 (FIG. 2), and rod second end 58 includes an aperture 62 configured to receive fastener 44. As such, torque rod 38 is pivotally mounted to bracket 32 at torque rod first end 56. A clearance or notch 28 (FIG. 5) is formed in cradle 14, and a clearance or notch 49 is formed in bushing housing 40 (see FIG. 5) to provide clearance for pivotal movement of torque rod 38. In the illustrated configuration, bushing housing 40 provides additional stiffness to cradle 14 in the area of notch 28.

As illustrated in FIGS. 4 and 5, torque rod second end 58 is disposed between bushings 34, 36 within notched portions 48, 54. Accordingly, lower bushing inner diameter 42, upper bushing inner diameter 50, and torque rod second end aperture 62 are aligned to receive fastener 44 (FIG. 4). As can be seen, bushings 34, 36 engage and support or at least partially support torque rod 38 at its second end 58.

Upper bushing housing 40 includes a bushing aperture 66 and one or more fastener apertures 68. Bushing aperture 66 is configured to receive at least a portion of upper bushing 36. In the exemplary embodiment, upper bushing 36 is disposed within housing 40 such upper bushing 36 is not disposed within or constrained by cradle 14. Fastener apertures 68 are configured to receive fasteners 70 to couple bushing housing 40 to cradle 14. Accordingly, upper bushing housing 40 provides increased stiffness to cradle 14, which results in improved vehicle structure for improved noise, vibration, harshness (NVH) and dynamics performance.

Figure 6:
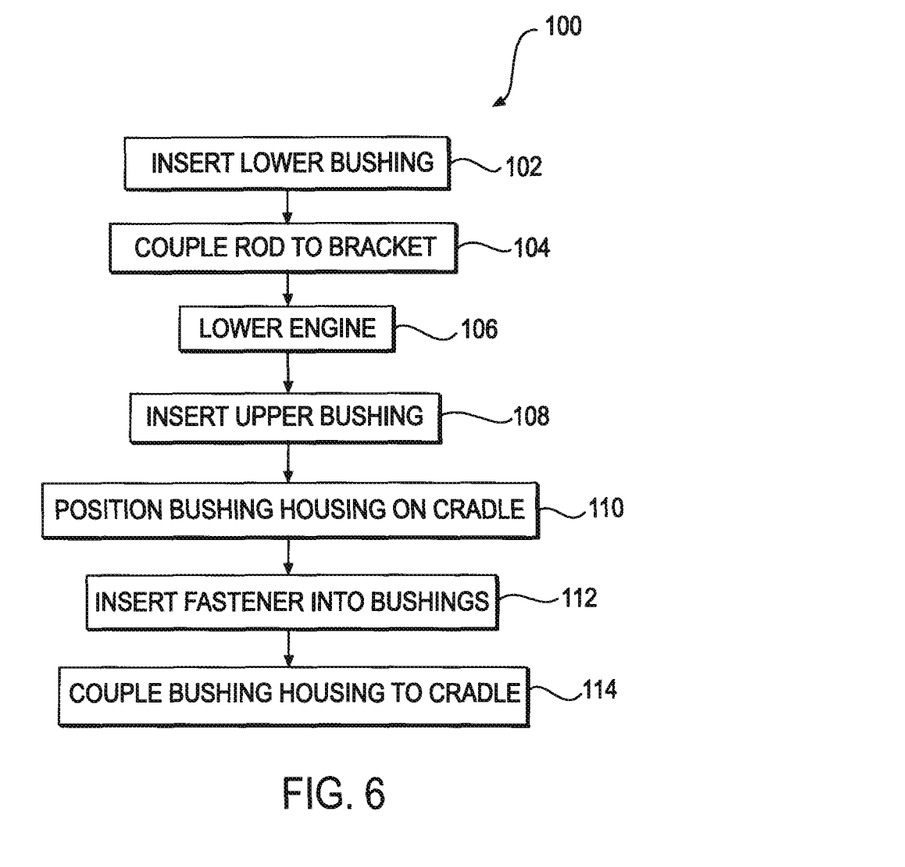
FIG. 6 is a flow diagram of an exemplary method of assembling the torque strut assembly shown in FIGS. 1-5 in accordance with the principles of the present disclosure.

Further, the split configuration of torque strut isolator assembly 30 enables a top-down assembly of engine 16, transmission 18, and PTU 20. As shown in FIG. 6 and with general reference to FIGS. 1-5, an exemplary top-down assembly method 100 begins at step 102 by inserting or disposing lower bushing 34 in lower bushing receiving aperture 26. At step 104, torque rod 38 is coupled to bracket 32, which is coupled to engine 16, and engine 16 may be coupled to transmission 18 and/or PTU 20. At step 106, engine 16 is lowered vertically toward cradle 14 such that torque rod second end 58 is lowered onto lower bushing 34. In particular, torque rod second end 58 is positioned in lower bushing notched portion 48. It will be understood that, in one exemplary embodiment, the above steps are performed independent of and before upper bushing is installed.

At step 108, upper bushing 36 is then inserted or disposed in bushing aperture 66 of bushing housing 40. At step 110, bushing housing 40 is positioned on cradle 14 over (i.e., above) lower bushing 34 such that inner diameter 42, inner diameter 50, and aperture 62 are aligned or substantially aligned. At step 112, fastener 44 or other securing device is inserted through inner diameter 42, inner diameter 50, and aperture 62 to couple lower bushing 34, upper bushing 36, and torque rod 38. At step 114, fasteners 70 are inserted into fastener apertures 68 to couple upper bushing housing 40 to cradle 14. However, bushing housing 40 may be coupled to cradle 14 using any suitable method (e.g., welding). Accordingly, method 100 in connection with the split configuration (i.e., two-piece bushing construction) of the torque rod isolator assembly 30 enables torque rod 38 and thus engine 16 to be lowered vertically without requiring horizontal movement to position the torque rod between the bushings. Further, the two-piece construction (i.e., bushing housing 40 assembled onto cradle 14 after torque rod 38 is in place) enables various other assembly orientations/methods that were not practical or possible with a PTU or similar device.

Described herein are systems and methods for a torque strut isolator assembly. The assembly includes a first and second separate bushings, a torque rod, and a bushing housing. The first bushing is disposed in a vehicle cradle, and the second bushing is disposed in the bushing housing. The torque rod is positioned on the first bushing, and the bushing housing along with the second bushing are positioned over the torque rod. The bushing housing is subsequently coupled to the cradle. Accordingly, the system provides a top down assembly and increases cradle strength/stiffness. The system allows the torque rod to remain straight (axially) as opposed to a single shear design where the torque rod cannot be straight in a system where the elastic centers of two bushings are required to be in-line. The multi-piece design allows tuning of the bushings differently for various driving conditions, and the bolt-on upper bushing allows an assembly where the various components need to stack up in a vertical/vehicle z-direction.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A split bushing torque strut isolator assembly for a vehicle, the assembly comprising:
    a lower bushing disposed in a bushing receiving aperture formed in a vehicle structural component;
    a bushing housing coupled to an upper surface of the vehicle structural component;
    an upper bushing disposed at least partially within the bushing housing, the upper bushing being separate from the lower bushing, the bushing housing positioned over the lower bushing such that the upper bushing is positioned over the lower bushing and the upper bushing is not positioned in the bushing receiving aperture; and
    a torque rod having a first end and a second end, the second end being disposed between the upper and lower bushings.

2. The assembly of claim 1, wherein the vehicle structural component is a vehicle cradle and the torque rod first end is configured to be coupled to a vehicle engine; and the bushing housing is coupled to the upper surface of the cradle and positioned over the bushing receiving aperture while remaining outside of the bushing receiving aperture.

3. The assembly of claim 1, wherein the lower bushing comprises a first notched portion, and the upper bushing comprises a second notched portion.

4. The assembly of claim 3, wherein the torque rod second end is disposed between the first and second notched portions and is at least partially supported by the upper and lower bushings.

5. The assembly of claim 1, wherein the upper and lower bushings are elastomeric bushings.

6. The assembly of claim 1, wherein the lower bushing comprises an inner diameter configured to receive a fastener.

7. The assembly of claim 6, wherein the torque rod comprises an aperture configured to receive the fastener.

8. The assembly of claim 7, wherein the upper bushing comprises an inner diameter configured to receive the fastener.

9. A method of assembling a split bushing torque strut isolator assembly, the method comprising:
provide a cradle having a bushing receiving aperture;
inserting a lower bushing into the bushing receiving aperture;
lowering a torque rod vertically onto the lower bushing without requiring horizontal movement of the torque rod;
providing a bushing housing having an upper bushing disposed at least partially in the bushing housing;
orienting the bushing housing over the torque rod such that the torque rod is disposed between the upper and lower bushings; and
coupling the bushing housing to an upper surface of the cradle.

10. The method of claim 9, wherein orienting the bushing housing over the torque rod includes orienting the bushing housing over the torque rod such that the torque rod is disposed in notched portions of the upper and lower bushings and the upper bushing is not positioned in the cradle.

11. The method of claim 9, further comprising disposing the upper bushing in the bushing housing.

12. The method of claim 9, further comprising inserting a fastener through the lower bushing, the torque rod, and the upper bushing.

13. The method of claim 9, further comprising coupling the torque rod to a vehicle engine before lowering the torque rod vertically onto the lower bushing such that the engine and torque rod coupled thereto are lowered vertically to position a second end of the torque rod onto the lower bushing without requiring any horizontal movement of the engine and torque rod.

14. The method of claim 9, further comprising coupling the torque rod to a bracket coupled to a vehicle engine.

* * * * *